US010896064B2

(12) United States Patent
Fong et al.

(10) Patent No.: US 10,896,064 B2
(45) Date of Patent: Jan. 19, 2021

(54) COORDINATED, TOPOLOGY-AWARE CPU-GPU-MEMORY SCHEDULING FOR CONTAINERIZED WORKLOADS

(71) Applicant: International Business Machines Corporation, Armonk, NY (US)

(72) Inventors: Liana Liyow Fong, Yorktown Heights, NY (US); Seelam R. Seetharami, Yorktown Heights, NY (US); Wei Tan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 15/469,892

(22) Filed: Mar. 27, 2017

(65) Prior Publication Data

US 2018/0276044 A1    Sep. 27, 2018

(51) Int. Cl.
*G06F 9/50* (2006.01)
*G06T 1/60* (2006.01)
*G06T 1/20* (2006.01)
*G06F 9/48* (2006.01)

(52) U.S. Cl.
CPC .......... *G06F 9/5038* (2013.01); *G06F 9/4881* (2013.01); *G06F 9/5016* (2013.01); *G06F 9/5044* (2013.01); *G06T 1/20* (2013.01); *G06T 1/60* (2013.01); *G06F 9/50* (2013.01); *G06F 2209/503* (2013.01)

(58) Field of Classification Search
USPC ........................................................ 718/104
See application file for complete search history.

(56) References Cited

U.S. PATENT DOCUMENTS

| 8,707,314 | B2* | 4/2014 | Gummaraju | G06F 9/5044 |
| | | | | 718/102 |
| 10,402,227 | B1* | 9/2019 | Kinney, Jr. | |
| 2012/0159506 | A1 | 6/2012 | Barham et al. | |
| 2014/0007128 | A1* | 1/2014 | Schroth | G06F 9/5044 |
| | | | | 718/104 |
| 2014/0025822 | A1 | 1/2014 | Guha et al. | |
| 2014/0122829 | A1 | 5/2014 | Barrow-Williams et al. | |
| 2016/0034528 | A1* | 2/2016 | Roy | G06F 9/5066 |
| | | | | 707/736 |
| 2018/0101371 | A1* | 4/2018 | Flanakin | G06F 8/36 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Eric C Wai
(74) *Attorney, Agent, or Firm* — Anthony Curro, Esq.; McGinn IP Law Group, PLLC

(57) ABSTRACT

A workload scheduling method, system, and computer program product include analyzing a resource scheduling requirement for processes of a workload including the communication patterns among CPUs and accelerators, creating feasible resources based on static resource information of the resources for the processes of the workload, and selecting an available resource of the feasible resources to assign the workload based on the resource scheduling requirement, such that the CPU and GPU connection topology of the selection matches the communication patterns of the workload.

24 Claims, 15 Drawing Sheets

COORDINATED, TOPOLOGY-AWARE CPU-GPU-MEMORY SCHEDULING FOR CONTAINERIZED WORKLOADS

BACKGROUND

The present invention relates generally to a workload scheduling method, and more particularly, but not by way of limitation, to a system, method, and computer program product for scheduling of workloads based on analysis of requirements on a Central Processing Unit (CPU), Memory and an accelerator such as a Graphics Processing Unit (GPU) or Field Programmable Gate Array (FPGA) for an incoming workload.

Cognitive computing relies on computing infrastructure with both scale-up and scale-out capabilities for big data and big compute processing. Accelerators such as GPUs and FPGAs are currently used pervasively by many cognitive application and services (e.g. machine learning and deep learning) as effective scale-up technologies. The accelerators are attached to CPU using different mechanisms forming a topology with CPU, memory and GPUs. Especially, there can be multiple CPUs and GPUs, forming a tree-like topology. For example, one or many GPUs may connect to a specific CPU, while other GPUs may connect to another CPU. For another example, many GPUs associated to a specific CPU, may communicate via different types of connection devices. As a result, the bandwidth for communication, including data transfer, between any pair of CPU and GPUs, or between any pair of GPUs, are topology-dependent and not identical. However, the work scheduling of workloads onto machines/clusters does not take into consideration of the topology and architectural attributes for efficient usage of GPUs and how this topology can match the communication patterns of the workloads, to achieve optimized execution time.

Conventional techniques in workload scheduling can be found in areas of non-uniform memory for multicore systems, network topology-aware scheduling, Message Passing Interface (MPI) task-geometry parallel, grid or cloud. Some conventional techniques consider how an application can optimally execute on machines with GPUs. However, none of the conventional techniques consider the challenges raised by GPUs as resources with distinct attributes and information transfer topology, the static and dynamic attributes of GPUs, the number of GPUs per CPU, the hierarchies of memory in bandwidth and capacity, and cross-device data transfer topology (e.g., memory access bandwidth, CPU-GPU (socket/memory))

SUMMARY

In an exemplary embodiment, the present invention can provide a computer-implemented workload scheduling method, the method including analyzing a resource scheduling requirement including its communication patterns for processes of a workload, creating feasible resources based on static resource information of the resources for the processes of the workload, and selecting an available resource of the feasible resources to assign the workload based on the resource scheduling requirement. The resource selection would select resources with connection topology best matching the communication patterns of the workload. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
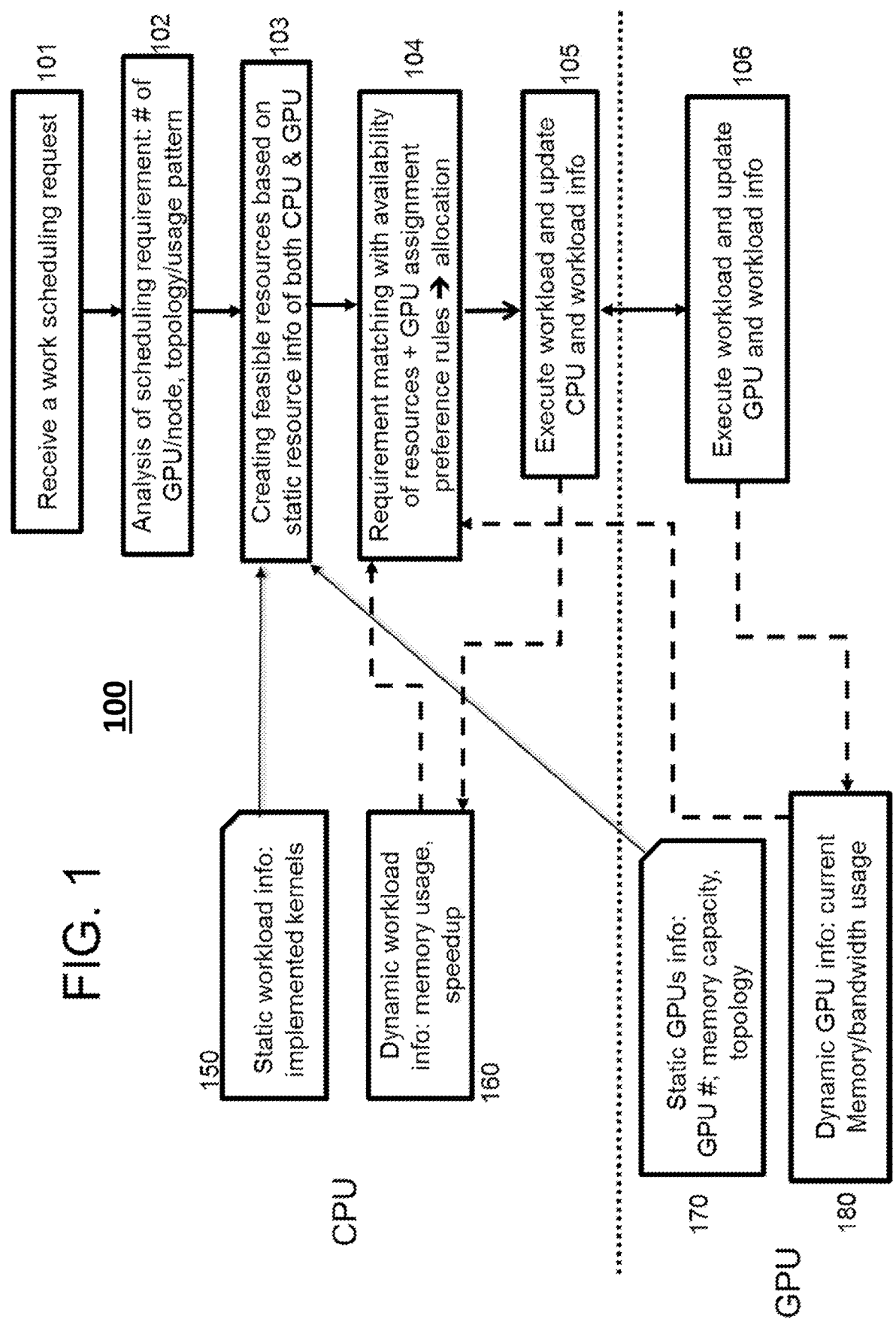
FIG. 1 exemplarily shows a high-level flow chart for a workload scheduling method 100 according to an embodiment of the present invention.

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a workload scheduling method 100 according to the present invention can include various steps for collecting information on workload resource requirements for execution including GPUs for offloading the computation to, matching the resource requirements with available resources in data center of machines with GPU resources, and dispatching the workload to allocated GPU, CPU and memory resources.

Figure 5:
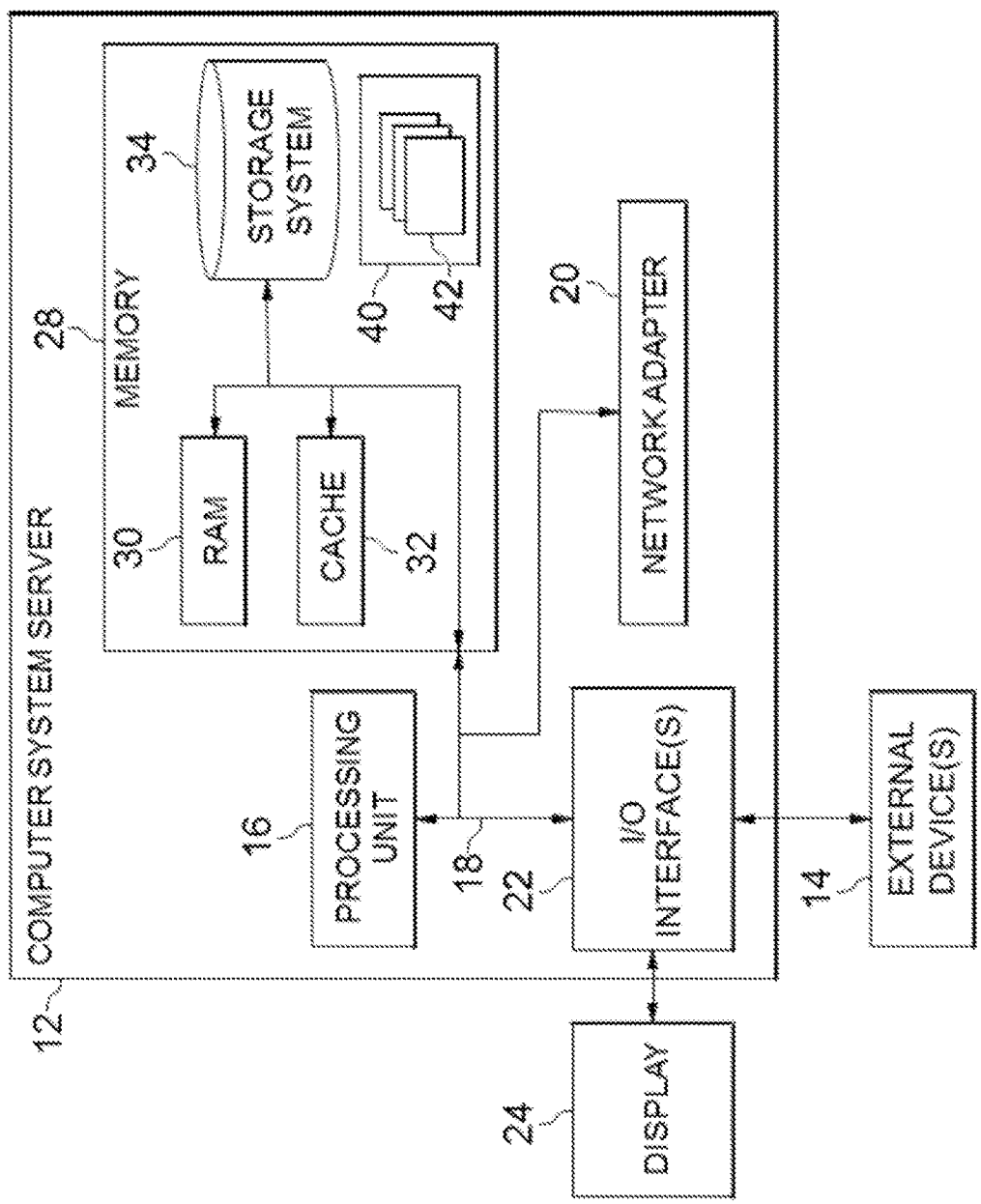
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1. Moreover, one type of I/O interfaces 14 can be PCI (peripheral component interface) and another type would be the NVLink, an advanced I/O interface with high bandwidth for information transfer.

Figure 7:
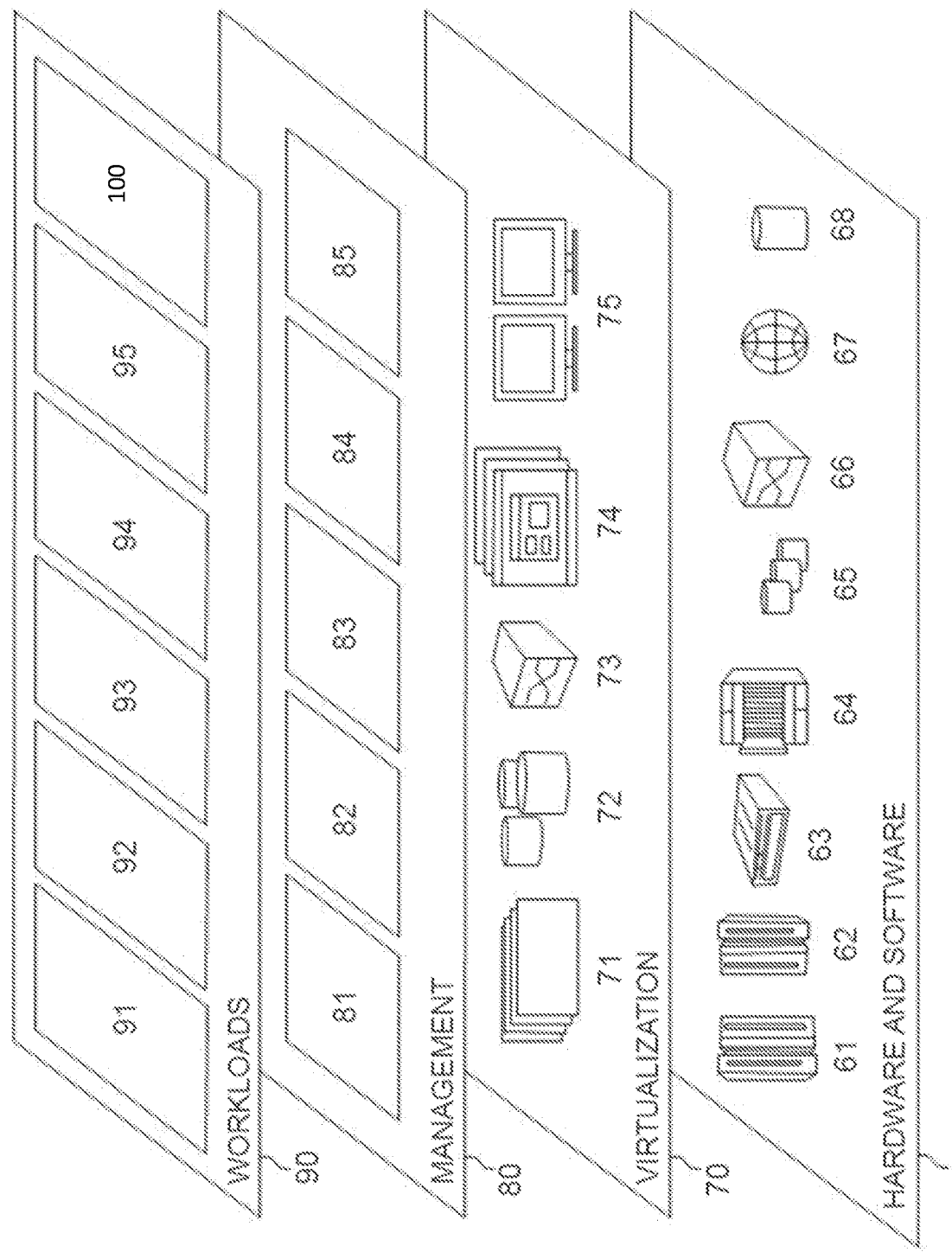
FIG. 7 depicts abstraction model layers according to an embodiment of the present invention.

Referring now generally to the embodiments of the invention by way of introduction of virtualization layer 70 in FIG. 7, virtualized elements can be virtual servers 71. Virtual servers can be in the form of virtual machines (VM) and containers. Virtual machines are emulated computer servers with a complete copy of an operation system and a specific set of resources associated. Containers are emulated operating system environments without a complete copy of operating system but can support application processing in isolation from other applications. Each container also has a specific set of resources associated. For virtual machines hosted on a physical server, their associated resources are limited to the whole or a portion of whatever resources associated to the physical server. Containers can host on a virtual machine or a physical server. Similarly, the associated resources for a container would be limited to the whole or a portion of resources of the hosting VM or physical server. That is, a container would not have GPUs if its hosting VM or physical server does not have GPUs. If all GPUs of the hosting physical server are already allocated to other VMs hosted on the server, no additional VM with GPU can be created on the same host. Similarly, this also applies to containers if hosted on physical servers. If containers hosted on VMs, such associated resources of containers would limit to what are associated with VMs. While there are VMs and containers can be virtual servers, containers will be used as a generic term for virtual servers from here.

Figure 2A:
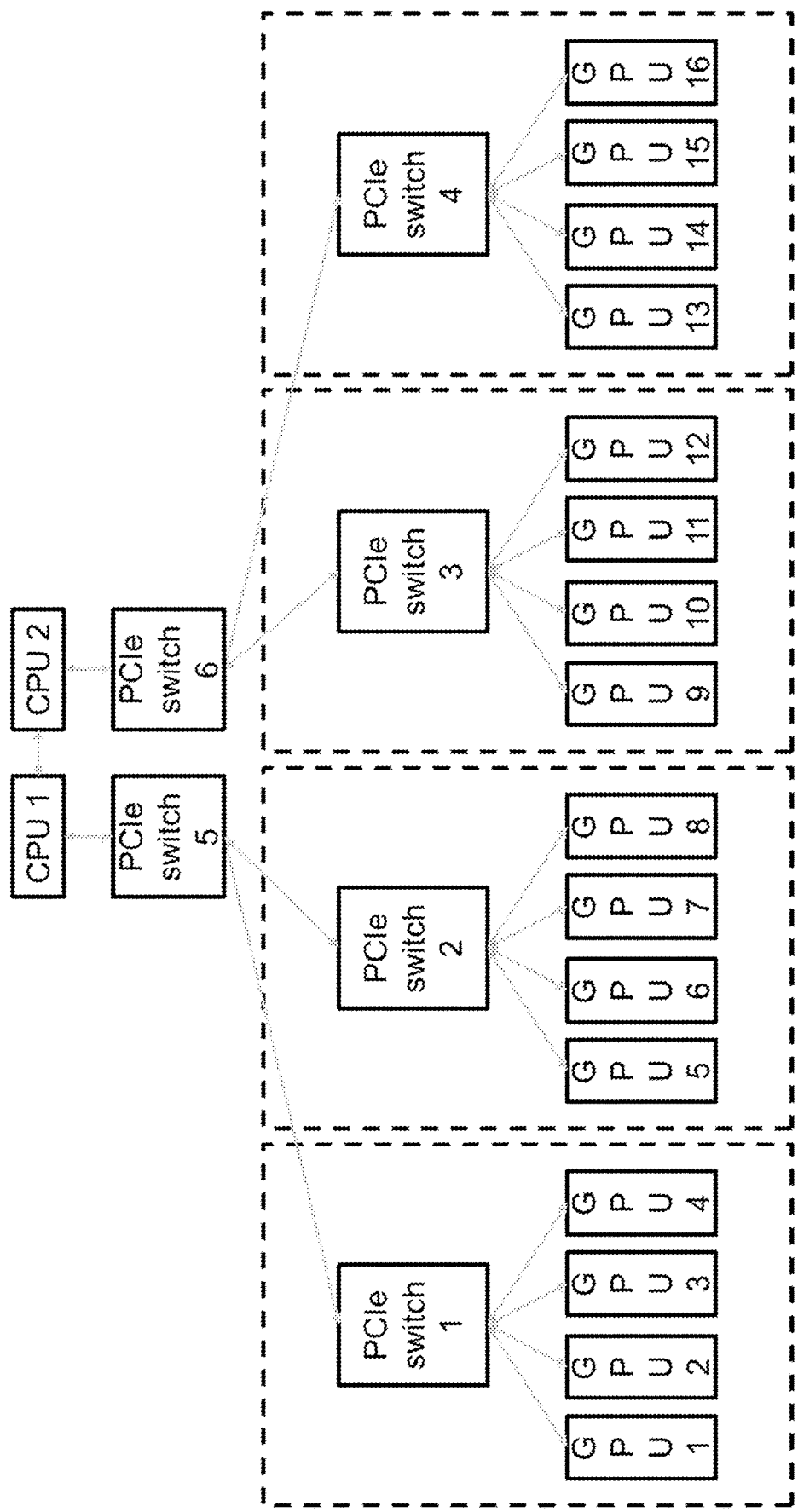
FIGS. 2A-C exemplarily depicts an architectural relationship of a CPU, network fabric, and a GPU according to an embodiment of the present invention.
Figure 2B:
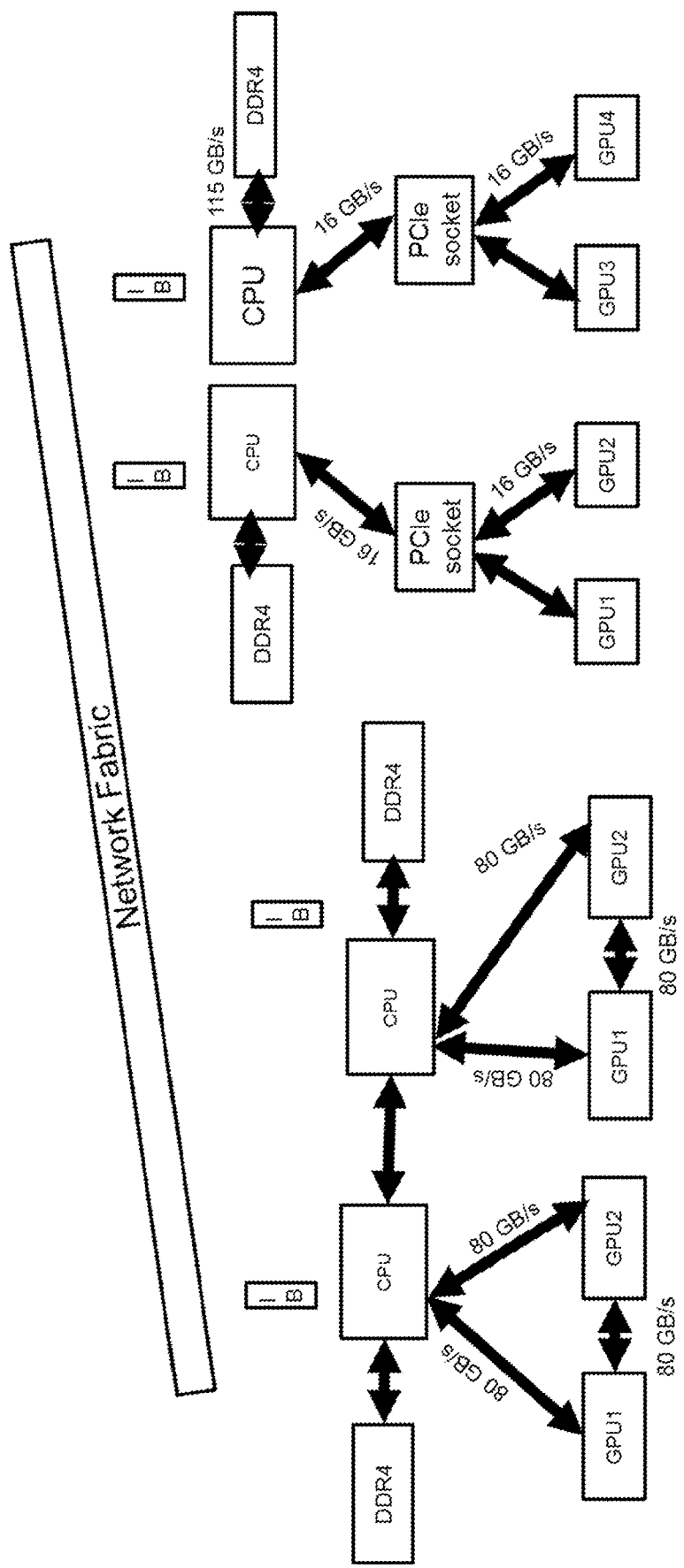
Figure 2C:
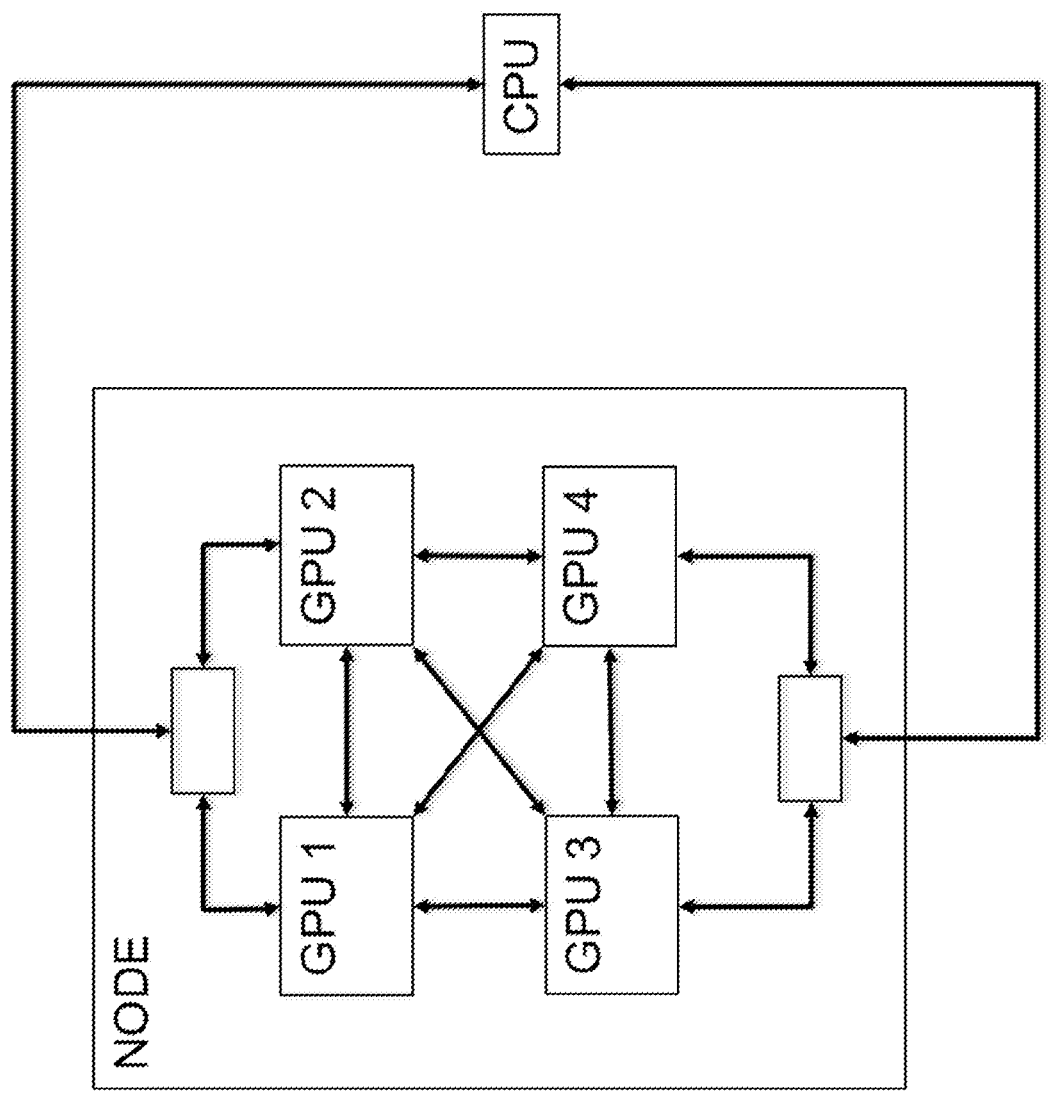

Referring now generally to the embodiments of the invention, as depicted in FIG. 2A-C, the accelerators are attached to CPU using different mechanisms forming a topology with different communication patterns between any pair of CPU and GPUs, or between any pair of GPUs. The communication rates are not identical. For example, if two GPUs can communication via only one PCIe switch (e.g., GPU 1 and GPU2 are attached to PCIe switch 1, in FIG. 2A), they can transfer data without copy through any CPU, and without interfering other PCIe switchs (switches 2, 3 and 4), enjoying the highest bandwidth. However, if two GPUs are directly attached to different PCIe switches, their communication needs to go through the two directly attached switches, and a third switch that connects the previous two switches (e.g., GPU 1 has to go through switch 1, switch 2 and switch 5 to copy to GPU 5), competing bandwidth with other GPUs. In the worst case, if two GPUs are attached to PCIe switches which are connected to different CPUs, their communication needs to go through not only switches but also CPUs, consuming the bandwidth of both PCIe switches and the inter-CPU channel (e.g., to transfer data from GPU 1 to GPU 9, GPU 1 has to go through switch 1 and switch 5 to copy data to CPU 1; CPU 1 needs to copy to CPU 2; then CPU 2 needs to copy to GPU 9 through switch 6 and switch 3). Another aspect of the topology is that, there are other type of connections such as NVLink which is faster than PCIe. In a computer cluster, we can have a mixture of PCIe and NVLink connected GPUs.

Referring generally to the embodiments of the invention, as depicted in FIG. 2B, data transfer rates across GPUs with advanced connection technology like an NVLink connection type is greater than data transfer rates across GPUs on a same PCIe. That is, data transfer rates among GPUs on the PCIe is greater than across GPUs on different sockets, and which is also greater than across GPUs on different servers via interconnect fabric such as Ethernet or InfiniBand.

FIG. 2C depicts a different method to connect multiple (in this example, 4) GPUs. Instead of using a tree-like topology that connects GPUs through PCIe switches, these four GPUs are connected through point-to-point links (in this example, NVLink). Using point-to-point links, you can adjust the bandwidth between any two pair of GPUs, by adding more links between them.

The tree-like topology determined the communication characteristics between CPUs and GPUs. More specifically, GPUs and CPUs which are closer in the tree topology, i.e., across least PCIe switches and CPUs, can communicate (i.e., transfer data) with high bandwidth and cause less influence to others. Therefore, when scheduling/placing a workload on many available GPUs, GPUs with closer affinity should be selected to execute the workload, to achieve better performance and bring least impact to other concurrently running workloads The workload characteristics include a single GPU intensive workload (minimal memory and CPU access), a multi-GPU workload (little GPU-GPU and GPU-CPU communication), a multi-GPU workloads with GPU-GPU communication, a single-GPU workload with frequent GPU-CPU communication and data exchanges, and multi-GPU workload with frequent GPU-CPU communication and data exchanges.

Referring now to FIG. 1, in step 101, a work-scheduling request is received.

In step 102, an analysis of scheduling requirement is performed on the number of the GPU/CPU and topology/usage pattern. The workload may specify explicit requirements, for example, a minimum or maximum number of virtual machines and containers (i.e., container(s) is a generic term for both virtual machines and containers), a minimum or maximum of CPU cores per container, a minimum or maximum of GPUs per container, a desired amount of memory for containers and/or for the GPUs, an hardware architecture type, an operating system type, and a GPU type, and GPU-GPU communication (e.g., yes/no or explicit specification of the bandwidth required). Also, a workload may have implicit requirements, for examples, service class with specific Service Level Agreements (SLA) requirements such as priority and cost. The analysis in step 102 can further include an analysis for consistency and validation checking. For example, if a workload specifies a requirement for GPUs number and a particular service class, which has a smaller number of GPUs as a limit, then the workload analysis would result failure in the consistency check. There may be validation tests such as if the user of incoming workload is eligible to request to execute in a service class with high priority.

For example, a workload can be received in step 101 that requires execution using one container of two GPUs with frequent but small communication packets exchange for synchronization. In step 102, such requirements of the workload are analyzed and determined the scheduling preference in having two GPUs on the same PCIe socket. In another case, the workload has large data exchange between GPUs, then the scheduling preference would be having two GPUs with NVLink connection with high bandwidth.

In step 103, basing on the scheduling requirements of an incoming workload from step 102, a set of feasible resources is created for the workload. The feasible resources are based on static resource information of CPU, memory, GPU and topology. For example, if the incoming workload requiring 2 GPUs per CPU, only CPU with two more GPUs will be included in the feasible set. Another example, a workload may have specific kernel implementation 150 for a specific type of GPUs, only CPUs with that type of GPUs would be placed into the feasible set. Yet another example, if incoming workload requiring communication bandwidth between GPU- and CPU is beyond PCI's bandwidth, then only CPUs with NVLink would be feasible resources 170. The feasible resources does not contain the dynamic resource usage incurred by other workloads and thus may not have the capacity available for the incoming workload. That is, the feasible resources has the containers or can be used to create containers with the requested compute, storage and network resources. For example, feasible resources are the ones with containers or have capability that containers can be created to have data transfer bandwidth greater than nnGB/s (NVLink capable). For another example, feasible resources are the ones with containers or that containers can be created to have the memory capacity, if specified.

In step 104, the resources are allocated to the workload by matching requirement with availability of resources including GPU assignment preference rules. The availability of resources is determined based on existing workload usage on these resources, including usage information such as memory capacity, memory bandwidth, compute capability, and speedup from both CPU 150 and GPU 180.

That is, in step 104, available containers are selected or necessary containers are created from feasible resources. The available containers are selected based on dynamic attributes of resources, for example, current memory capacity and/or cores of CPU, current number of GPUs for exclusive usage matched requiring quantity of this workload, etc. The GPU preference assignment rules are applied based on the GPU topology for performance gain. For example, workload characteristics are applied to order the priority of containers and GPUs. Similarly, GPUs with NVLink would be given high priority for workload with high rate/load in cross-GPU data transfer, GPUs on the same socket would prefer over those on different sockets for workload with high rate/load cross GPUs data transfer, and GPUs on different socket would be preferred for workload with low rate/load of cross-GPU data transfer and heavy CPU-GPU data transfer, and CPU and GPUs on different sockets would not be preferred for workload with heavy CPU-GPU data transfer. That is, resource capability, capacity and topological configuration are all considered. If enough resources meet the requirements, one set of resources is selected using service level agreement, if specified, for assignment and then the workload is dispatched for execution. If not enough containers with available resources, a suboptimal resource plan is generated and return to the user for further judgment, if necessary.

Also, job to resource assignment algorithms can be NP-hard, meaning no known algorithms that can find optimal solutions in polynomial time. Adding GPU and topology information would introduce additional complexity. The assignment process needs efficiency, especially when incoming request rate is high. Some applicable techniques for assignment tasks include, but are not limited to, graph matching algorithms, genetic algorithms, heuristics, etc.

In steps 105 and 106, the workloads are executed on the CPUs and the CPU and workload information 160 is updated and the workloads are executed on the GPUs and the GPU and workload information 180 is updated. The dynamically updated workload information can be used as feedback to aim the subsequent resource assignment tasks.

Referring now to FIGS. 2A-C, an exemplary architectural relationship of CPUs, GPUs, memory, and a network fiber. For example, a GPU to CPU architecture including PCIe sockets is depicted in which memory (i.e., DDR4, DDR3.) is connected with a CPU which in turn is connected to the PCIe socket of which GPU1 and GPU2 are connected therewith with a 16 GB/s bandwidth connection. Further, a GPU to CPU architecture is depicted including an NVLink connection having a bandwidth of 80 GB/s, as of current generation of technology, in which the CPU is connected to each GPU and the GPUs are connected to each other directly.

Figure 3A:
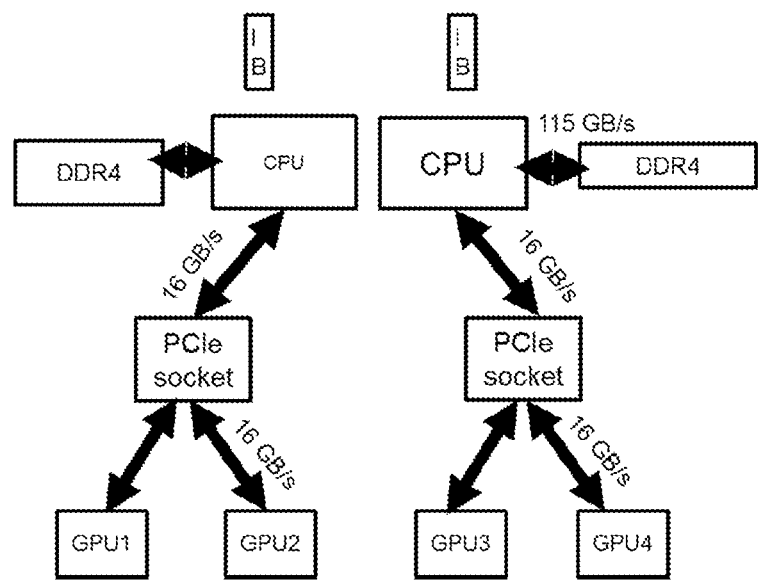
FIGS. 3A-G exemplarily depicts workload scheduling placements on a GPU and CPU architecture including a PCIe socket.
Figure 3B:
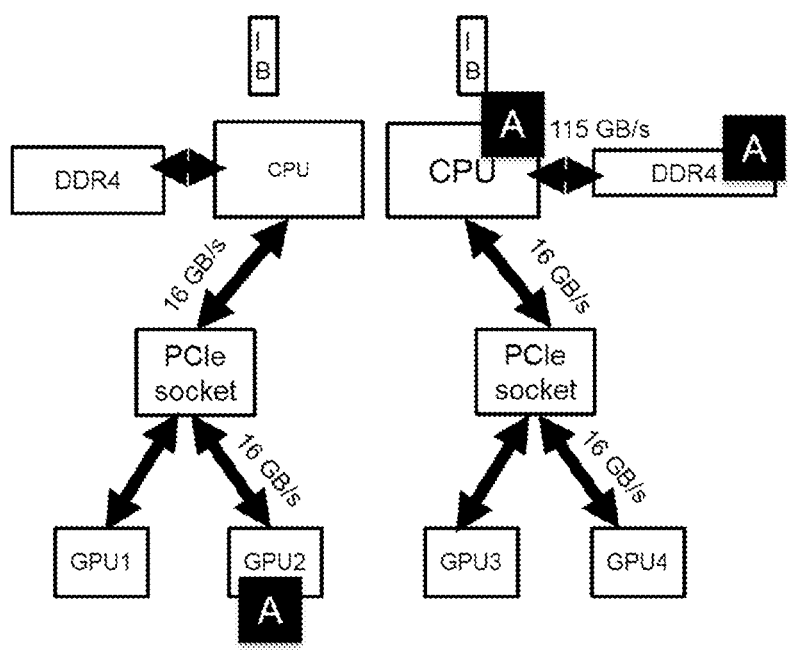
Figure 3C:
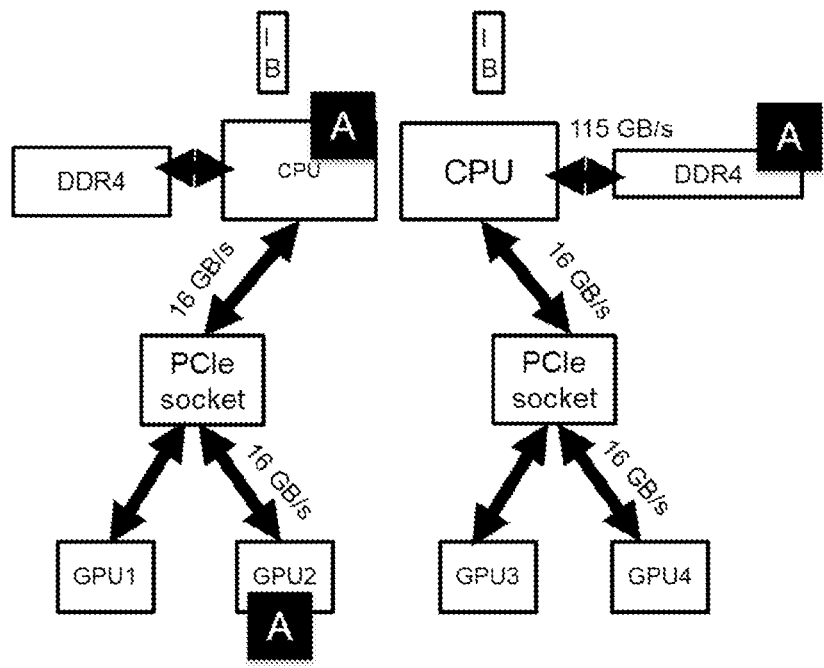
Figure 3D:
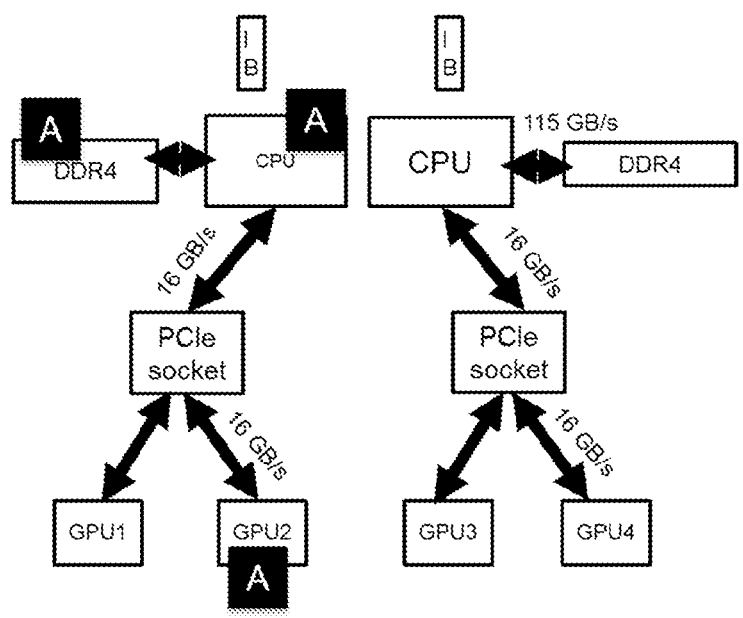

Referring now to FIGS. 3A-4G, FIG. 3A exemplarily depicts the GPU and CPU architecture having a PCIe socket and FIGS. 3B-G depicts workload placement thereon. FIGS. 3B-D depict a workload placement for a workload A (i.e., a received workload request in step 101) requiring a process on one GPU, one gigabyte of memory, and one CPU (i.e., result of analysis in step 102). Conventional techniques may place the workload A as shown in FIG. 3B-C such that the workload requirements of resources are satisfied but the placement is not optimal for processing or speed. As shown in FIG. 3D, based on the requirement matching and GPU allocation rules in step 104, the workload A is executed in steps 105 and 106 such that the memory with the workload is directly connected to the CPU processing the workload which in turn is directly connected through the PCIe socket to the GPU.

Figure 3E:
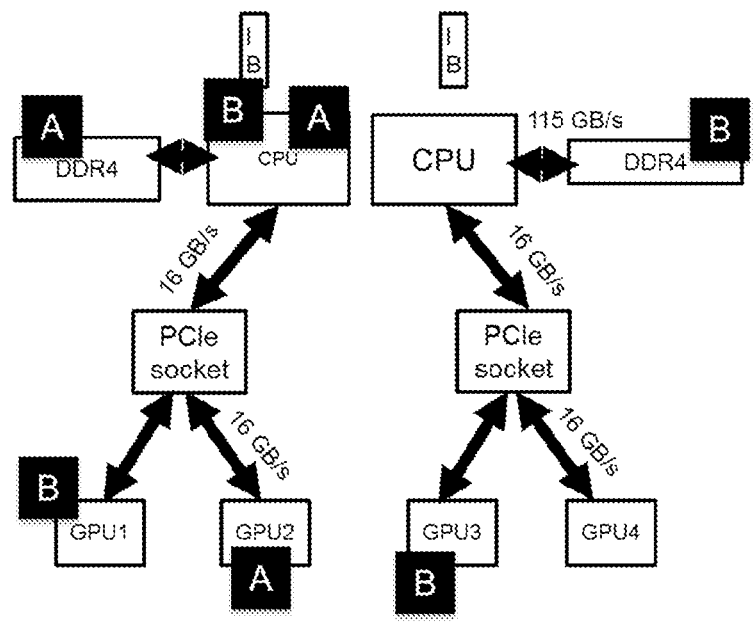
Figure 3F:
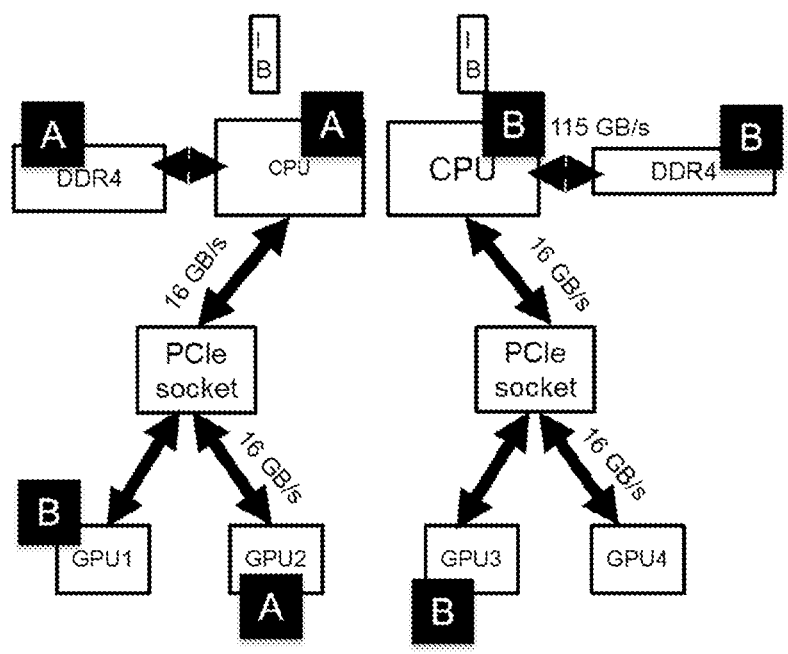

Based on the workload A being placed on the system as depicted in FIGS. 3B-D (i.e., the results of the analysis in step 102 showing which nodes are currently being used by a process of a workload), a workload B is placed on the system that requires two GPUs, one gigabyte of memory, and one CPU. As depicted in FIG. 3E, the computation of process B is placed on the CPU that is already is processing the computation of process A from workload A. Also, the memory process is placed on a memory not connected with the CPU. Thus, the placement is inefficient. Similarly, although the placement in FIG. 3F is slightly more efficient than the placement in FIG. 3E, the processes B placed on the GPUs are not placed on connected GPUs.

Figure 3G:
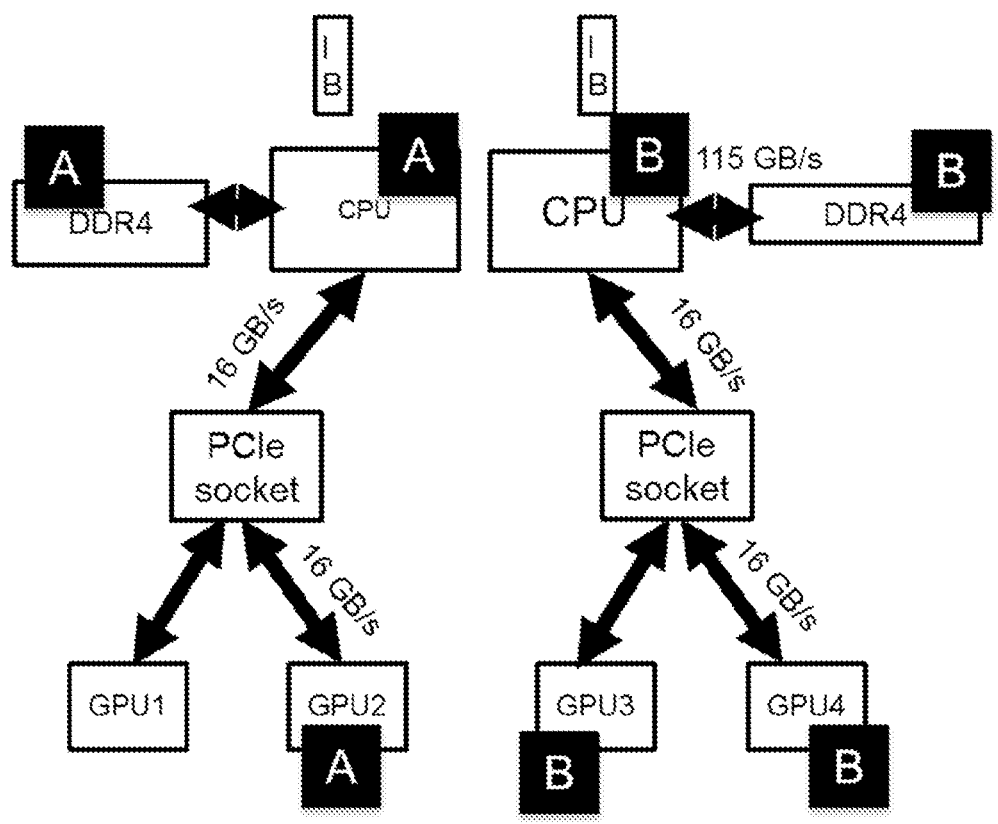

However, as depicted in FIG. 3G, based on the analysis of step 102, the feasibility of available resources in step 103, and the GPU assignment rules in step 104, the workload B is placed on two GPUs that are connected via the same PCIe to the CPU and memory of having the processes B.

Figure 4A:
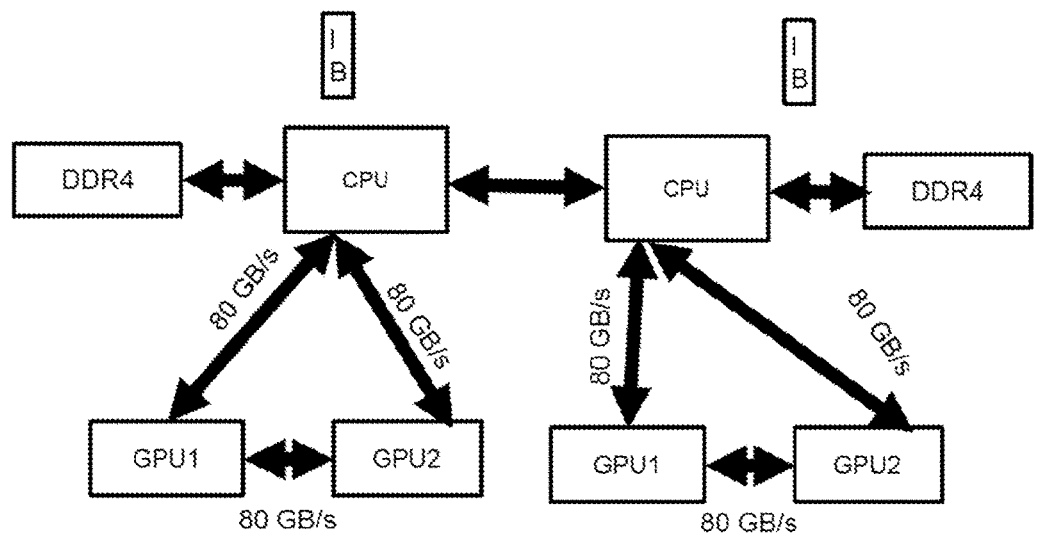
FIGS. 4A-G exemplarily depicts workload scheduling placements on a GPU and CPU architecture including an NVlink™ connection.
Figure 4B:
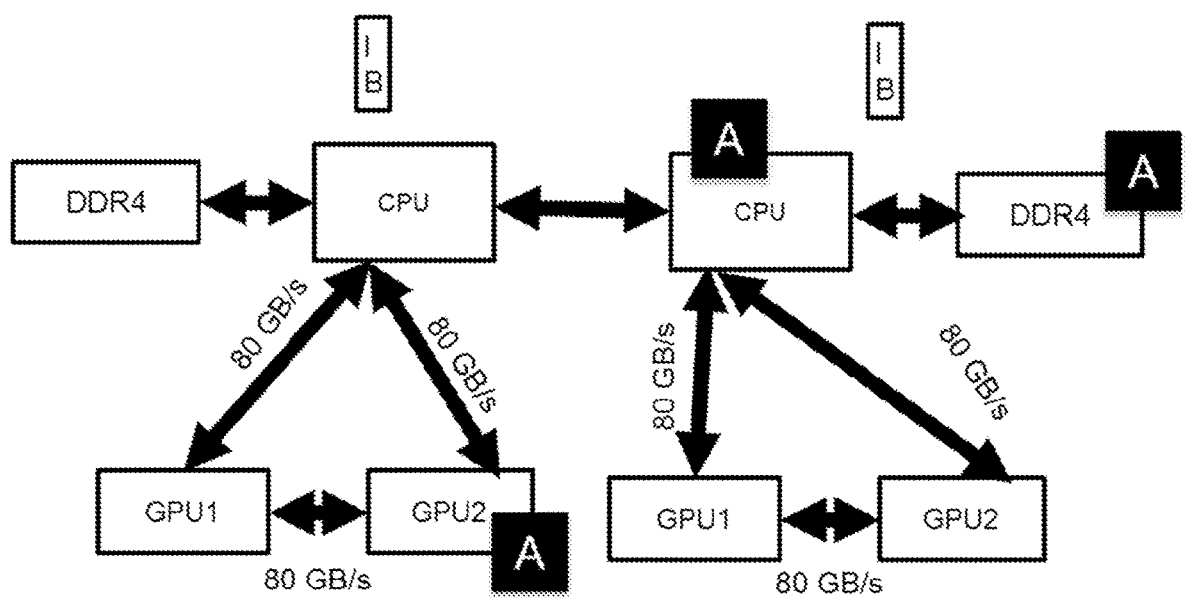
Figure 4C:
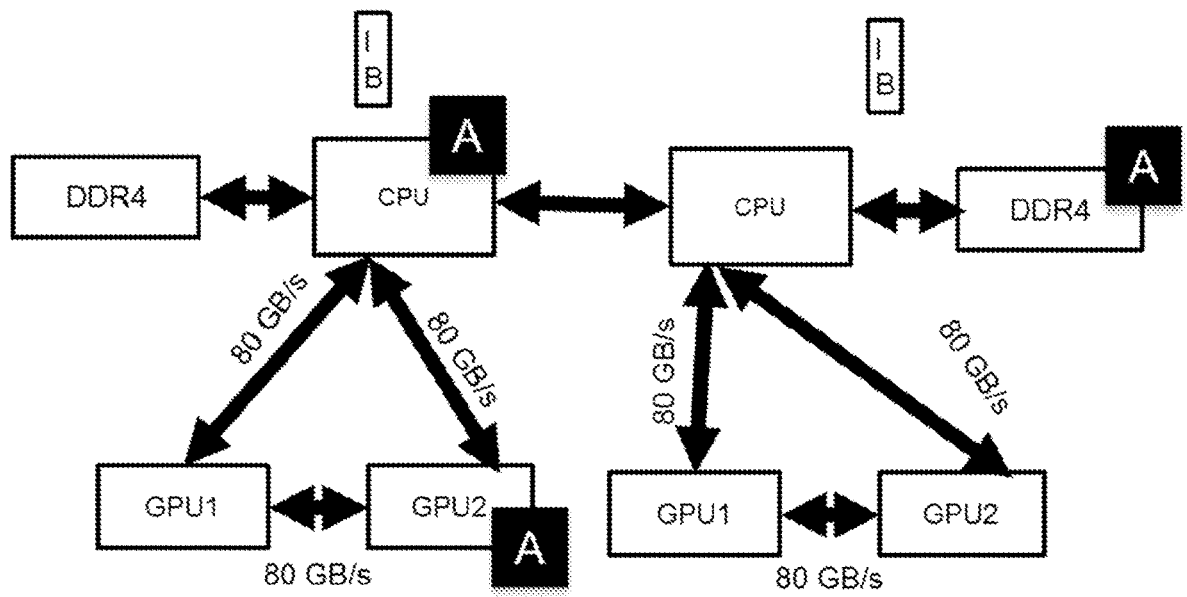
Figure 4D:
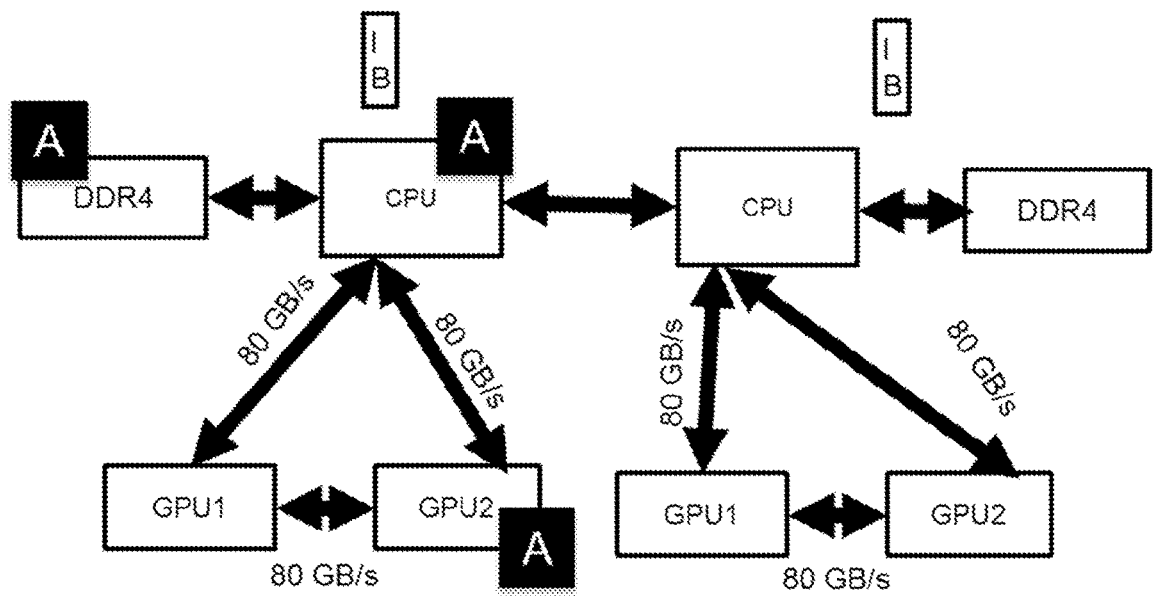
Figure 4E:
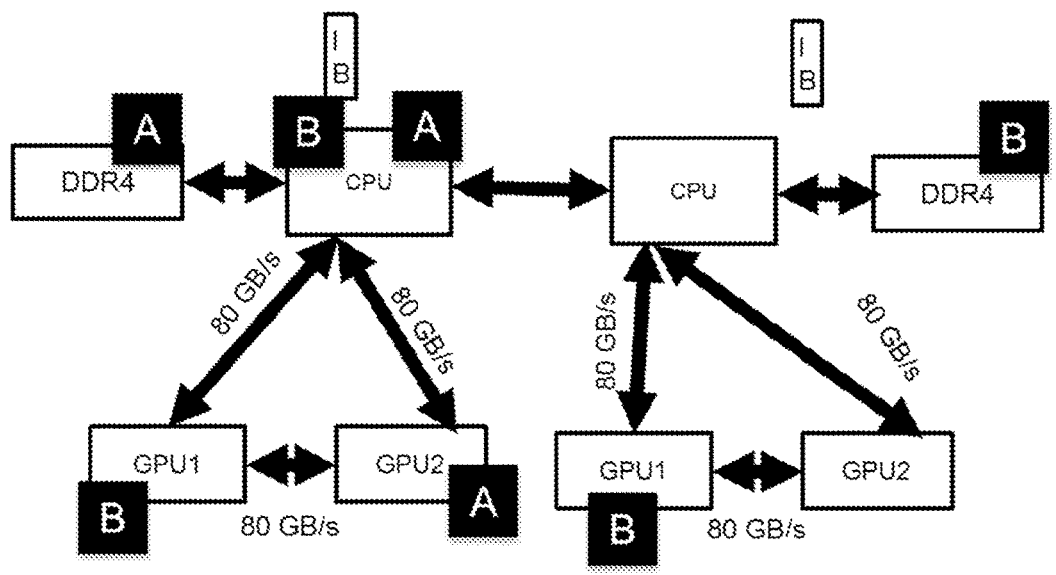
Figure 4F:
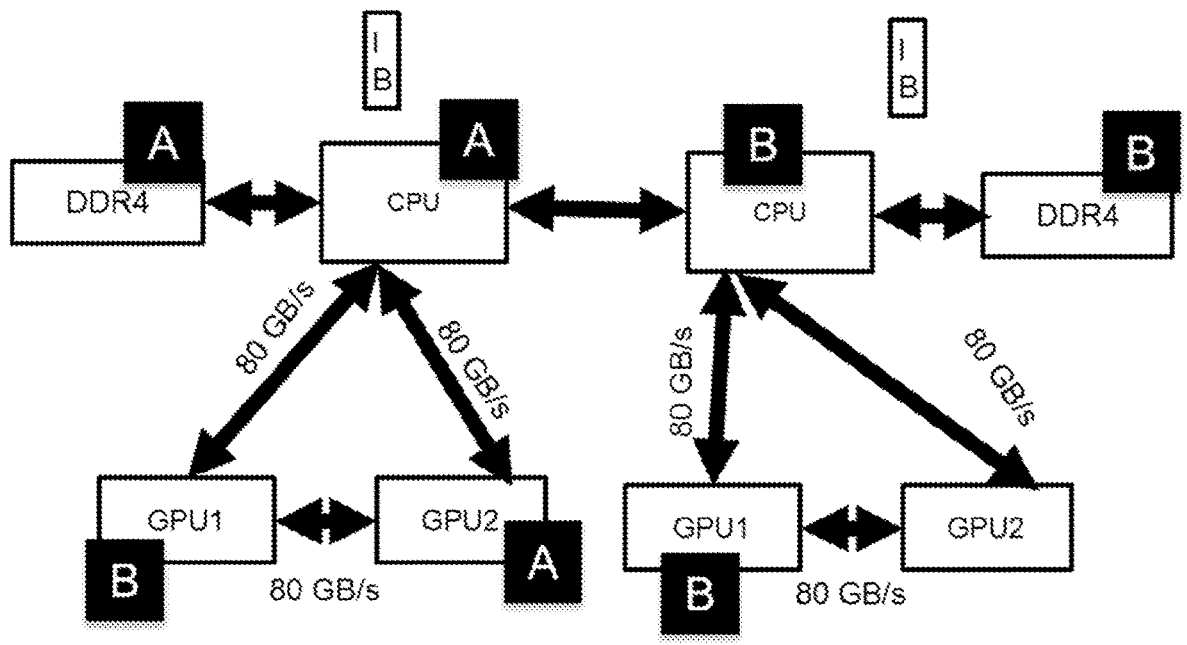
Figure 4G:
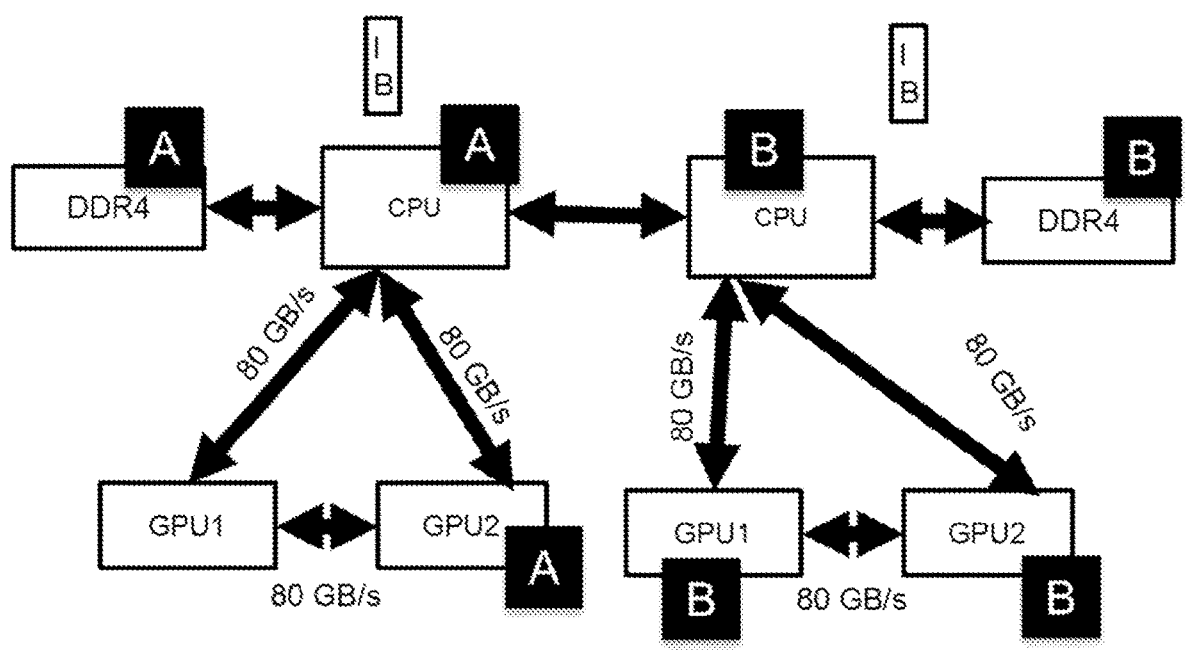

FIGS. 4A-G similarly depict workload placement for workloads A and B as discussed above with reference to FIGS. 3A-3G However, FIGS. 4A-G depict a GPU and CPU architecture utilizing an NVLink connection technology such that the GPUs are interconnected to each other and the connection links between the GPU-GPU/CPU-GPU are each 80 GB/s as shown in FIG. 4A. FIGS. 4B-C exemplarily depict a less preferable workload placement for workload A and FIG. 4D exemplarily depicts a placement of the processes of workload A using the method 100. Similarly, FIGS. 4E-F exemplarily depict less preferable workload placement for workload B with the pre-existing workload A already placed. Using the method 100, FIG. 4G exemplarily depicts a workload placement and execution of the processes for workload B (with workload A already being placed). It is noted that the GPUs are connected in pairs with the NVlink technology unlike the PCIe socket type architecture. Thus, the GPU preference rules of step 104 can include matching processes on a CPU with two available GPUs connected thereto in the NVLink architecture scheme such that the processes can be placed on GPUs that are connected with each other (i.e., as depicted in FIG. 4G). However, some workloads do not require intensive GPU processes and the workloads can be placed on GPUs that are not connected with each other such as depicted in FIG. 4E For example, if the GPU4 in FIG. 4F was being used by another process or had a malfunction and if the GPU to GPU connection requirement was lower for the process, the placement of the workload depicted in FIG. 4F could potentially result as the most optimal placement since the GPU to GPU communication requirement for the workload is less intensive than the placement in FIG. 4G.

FIGS. 3 A-G and FIGS. 4 A-G present exemplary and preferred embodiments on how to perform resource to workloads assignments based on coordinated, topology-aware CPU-GPU-memory.

In some embodiments, an additional feedback step can be implemented for monitoring actual workload/process usage of the components. For example, a client typically requests all the memory capacity on an entire GPU for their workload. However, if the workload has the process placed on the GPU and it is determined that the process only uses, for example, thirty-percent of the GPU capacity, the GPU can be additionally used for another process of a workload requiring up to seventy-percent of the GPU capacity. That is, in cloud-computing, many processes are iterative in nature and learning the requirements of each process to update the dynamic information 160 and 180 can result in a more efficient placement of processes of a system. For example, several processes can be placed on the same GPU having learnt that each process only uses a portion of the GPU capacity. The learning step can greatly increase the capacity of a system as well as provide a different cost scheme based on actual use of the resources rather than requested use (i.e., client requests a dedicated GPU for their workload and pays a given rate when the learning can provide a feedback that the entire GPU is not used and their payment rate can be decreased).

It is further noted that although the architecture described in FIGS. 2A-4G included a PCIe type socket and an NVLink connection, the connection types are exemplarily only and the invention is not limited thereto. The method 100 can be adapted to place workloads on any type of system architecture.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
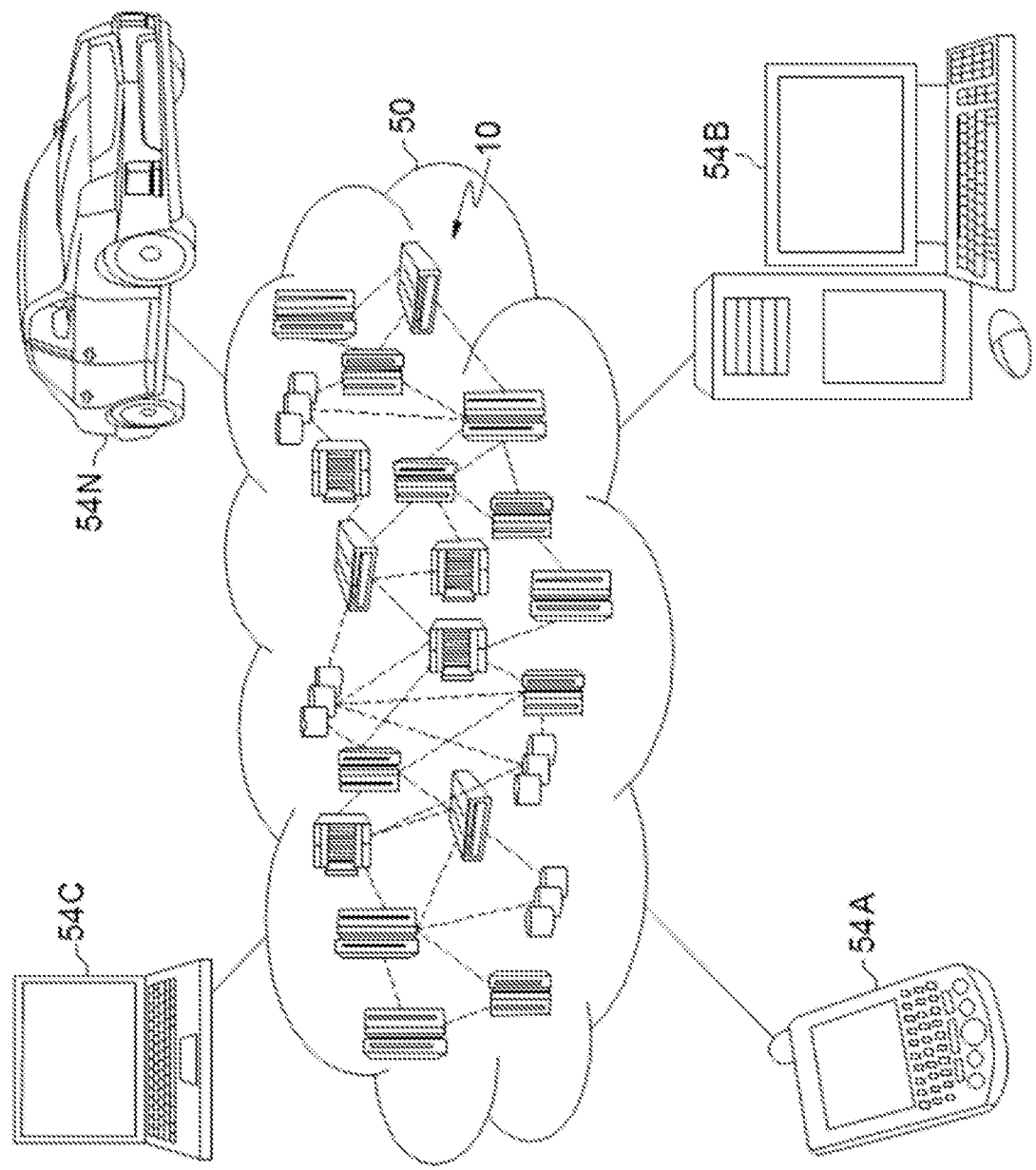
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload scheduling method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented workload scheduling method, the method comprising:
    analyzing:
        a resource scheduling requirement for processes of a workload involving computer accelerators including a Graphics Processing Unit (GPU) as a discrete type of a computing resource;
        a relationship, a capacity, and a processing connection type between:
            the GPU to a Central Processing Unit (CPU) and network connection;
            computer accelerators and second network connection between the computer accelerators, the network connection between the computer accelerators and the CPU being different than the second network connection between the computer accelerators; and
        a location, of the computer accelerators, in sockets in relation to each other and to the CPU;
    creating feasible resources having a specific kernel implementation for a specific type of the GPU based on static characteristics and topology configuration of the resources for the processes of the workload;
    selecting an available resource of the feasible resources to assign to the workload based on the resource scheduling requirement, the capacity, and according to the assignment preference rules, the assignment preference rules being applied based on the relationship and processing connection type for performance gain;
    implementing a feedback step for monitoring an actual workload of the processes after the selecting selects the available resource; and
    assigning an additional processes to the GPU to be performed concurrently with the workload when the actual workload is determined less than a threshold amount by the feedback step.

2. The computer-implemented method of claim 1, wherein the resource scheduling requirement includes at least one of:
    a minimum or maximum number of containers required for the workload;
    a minimum or maximum of Central Processing Unit (CPU) cores required per container;
    a minimum or maximum of the Graphics Processing Unit (GPU) required per container or required for the total number of the containers;
    a desired amount of memory for the CPU or the GPU;
    an architecture type of a system for deploying the workload;
    an operating system of the system for deploying the workload;
    at least one of a type of the GPU, the CPU, and the memory; and
    a type of implemented kernels for the GPU.

3. The computer-implemented method of claim 1, wherein the static resource information of the resources includes:
    static workload information of the Central Processing Unit (CPU);
    static Graphics Processing Unit (GPU) information including memory capacity and hierarchy; and
    a number of the GPUs and associated topology.

4. The computer-implemented method of claim 1, wherein the feasible resources are created based on a determination of which container in a system is currently assigned resources of a separate workload, and
    further comprising performing a validation test such that if a user of an incoming workload is eligible to request to execute in a service class with, high priority.

5. The computer-implemented method of claim 1, wherein the creating creates the feasible resources by determining, within a container, which of the resources that meet the workload requirements.

6. The computer-implemented method of claim 1, wherein the feasible resources are further based on a capability of an architecture of a system.

7. The computer-implemented method of claim 1, wherein, if an amount of the available resources meets the requirements, a set of the available resources is selected for assignment and then the workload is dispatched for execution.

8. The computer-implemented method of claim 1, wherein the workload is assigned to the available resource based on some assignment logic including but not limited to:
   a graph matching algorithm;
   a genetic algorithm; and
   heuristics.

9. The computer-implemented method of claim 1, wherein an actual resource requirement of the execution of the assigned workload is learned, and
   wherein the resource scheduling requirement is updated with the learned actual resource requirement.

10. The computer-implemented method of claim 1, embodied in a cloud-computing environment.

11. The computer-implemented method of claim 1, wherein the computer accelerators are installed on an enterprise class or cloud-based network, and
   wherein the selecting prefers to assign the feasible resources from a same location on the computer.

12. The computer-implemented method of claim 1, wherein the selecting selects the available resources by applying GPU preference assignment rules based on the given communication pattern of the workload, and the CPU, memory, and GPU connection topology.

13. A computer program product for workload scheduling, the computer program product comprising a computer-readable storage medium having program instructions embodied therewith, the program instructions executable by a computer to cause the computer to perform:
   analyzing:
      a resource scheduling requirement for processes of a workload involving computer accelerators including a Graphics Processing Unit (GPU) as a discrete type of a computing resource;
      a relationship, a capacity, and a processing connection type between:
         the GPU to a Central Processing Unit (CPU) and network connection;
         computer accelerators and second network connection between the computer accelerators, the network connection between the computer accelerators and the CPU being different than, the second network connection between the computer accelerators; and
      a location of the computer accelerators in sockets in relation to each other and to the CPU;
   creating feasible resources having a specific kernel implementation for a specific type of the GPU based on static characteristics and topology configuration of the resources for the processes of the workload;
   selecting an available resource of the feasible resources to assign to the workload based on the resource scheduling requirement, the capacity, and according to assignment preference rules, the assignment preference rules being applied based on the relationship and processing connection type for performance gain;
   implementing a feedback step for monitoring an actual workload of the processes after the selecting selects the available resource; and
   assigning an additional processes to the GPU to be performed concurrently with the workload when the actual workload is determined less than a threshold amount by the feedback step.

14. The computer program product of claim 13, wherein the resource scheduling requirement includes at least one of:
   a minimum or maximum number of containers required for the workload;
   a minimum or maximum of Central Processing Unit (CPU) cores required per container;
   a minimum or maximum of the Graphics Processing Unit (GPU) total number of the containers;
   a desired amount of memory for the CPU or the GPU;
   an architecture type of a system for deploying the workload;
   an operating system of the system for deploying the workload; and
   at east one of a type of the GPU, the CPU, and the memory.

15. The computer program product of claim 13, wherein the static resource information of the resources includes:
   static workload information and implemented kernels of Central Processing Unit (CPU);
   static Graphics Processing Unit (GPU) information and a number of the GPUs; and
   a capacity acid a topology of the memory.

16. The computer program product of claim 13, wherein the feasible resources are created based on a determination of which container in a system is currently assigned resources of a separate workload.

17. The computer program product of claim 13, wherein the creating creates the feasible resources by determining, within a container, which of the resources that meet the workload requirements.

18. The computer program product of claim 13, wherein the feasible resources are further based on a capability of an architecture of a system.

19. A workload scheduling system, said system comprising:
   a processor; and
   a memory, the memory storing instructions to cause the processor to perform:
      analyzing:
         a resource scheduling requirement for processes of a workload involving computer accelerators including a Graphics Processing Unit (GPU) as a discrete type of a computing resource;
         a relationship, a capacity, and a processing connection type between:
            the GPU to a Central Processing Unit (CPU) and network connection;
            computing accelerators and second network connection between the computer accelerators, the network connection between the computer accelerators and the CPU being different than the second network connection between the computer accelerators; and
         a location of the computer accelerators in sockets in relation to each other and to the CPU;
      creating feasible resources having a specific kernel implementation for a specific type of the GPU based on static characteristics and topology configuration of the resources for the processes of the workload;

selecting an available resource of the feasible resources to assign to the workload based on the resource scheduling requirement, the capacity, and according to assignment preference rules, the assignment preference rules being applied based on the relationship and processing connection type for performance gain;

implementing a feedback step for monitoring an actual workload of the processes after the selecting selects the available resource; and assigning an additional processes to the GPU to be performed concurrently with the workload when the actual workload is determined less than a threshold amount by the feedback step.

20. The system of claim 19, wherein the feasible resources are created based on a determination of which container in a system is currently assigned resources of a separate workload.

21. The system of claim 19, wherein the creating creates the feasible resources by determining, within a container, which of the resources that meet the workload requirements.

22. The system of claim 19, embodied in a cloud-computing environment.

23. A computer-implemented workload scheduling method, the method comprising:
   collecting information on workload resource requirements for execution of a work request for processing a workload including:
      a Graphics Processing Unit (GPU) as a discrete type of a computing resource; a relationship, a capacity, and a processing connection type between:
         the GPU to a Central Processing Unit (CPU) and network connection;
         computer accelerators and second network connection between the computer accelerators, the network connection between the computer accelerators and the CPU being different than the second network connection between the computer accelerators; and
      a location of the computer accelerators in sockets in relation to each other and to the CPU;
   matching the workload resource requirements with available resources having a specific kernel implementation for a specific type of the GPU in a data center of machines;
   dispatching the workload to an allocated Graphics Processing Unit (GPU), the Central Processing Unit (CPU), and memory resources based on the matched workload resource requirements to the available resources, the capacity, and according to assignment preference rules, the assignment preference rules being, applied based on the relationship and processing connection type for performance gain;
   implementing a feedback step for monitoring an actual workload of the workload after the dispatching dispatches the available resource; and
   assigning an additional processes to the GPU to be performed concurrently with the workload when the actual workload is determined less than a threshold amount by the feedback step.

24. The computer-implemented method of claim 23, wherein the matching the workload resource requirements to available resources is based on at least one of:
   a static attribute of the resources; and
   a dynamic attribute of the resources.

* * * * *